(12) United States Patent
Zhou (10) Patent No.: US 11,528,311 B2
(45) Date of Patent: Dec. 13, 2022

(54) METHOD FOR TRANSMITTING MULTIMEDIA RESOURCE AND TERMINAL

(71) Applicant: BEIJING DAJIA INTERNET INFORMATION TECHNOLOGY CO., LTD., Beijing (CN)

(72) Inventor: Chao Zhou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/473,189

(22) Filed: Sep. 13, 2021

(65) Prior Publication Data

US 2021/0409470 A1 Dec. 30, 2021

Related U.S. Application Data

(63) Continuation of application No. PCT/CN2020/131840, filed on Nov. 26, 2020.

(30) Foreign Application Priority Data

Jan. 17, 2020 (CN) .......................... 202010054781.8

(51) Int. Cl.
*H04L 65/613* (2022.01)

(52) U.S. Cl.
CPC ................................. *H04L 65/613* (2022.05)

(58) Field of Classification Search
CPC ..... H04L 65/4092; H04L 67/02; H04L 67/10; H04L 67/2842; H04L 67/289;
(Continued)

(56) References Cited

U.S. PATENT DOCUMENTS 8,938,767 B2    1/2015   Chen et al.
9,674,266 B2 *   6/2017   Andersson ............ H04L 65/604
(Continued)

FOREIGN PATENT DOCUMENTS

CN     102957672 A     3/2013
CN     103856806 A     6/2014
(Continued)

OTHER PUBLICATIONS

The State Intellectual Property Office of People's Republic of China, First Office Action in Patent Application No. CN202010054781.8 dated Nov. 1, 2021, which is a foreign counterpart application corresponding to this U.S. Patent Application, to which this application claims priority.
(Continued)

*Primary Examiner* — Oanh Duong
(74) *Attorney, Agent, or Firm* — Kolitch Romano Dascenzo Gates LLC (57) ABSTRACT

A method for transmitting a multimedia resource, including: determining target address information based on a media presentation description of a multimedia resource, where the media presentation description includes address information of the multimedia resource having different code rates, and the target address information is address information of the multimedia resource having a target code rate; and sending a frame acquiring request carrying the target address information to a server, where the frame acquiring request is configured to instruct the server to return media frames of the multimedia resource at the target code rate.

20 Claims, 4 Drawing Sheets

(58) Field of Classification Search
CPC .. H04L 65/80; H04N 21/238; H04N 21/2662; H04N 21/64; H04N 21/845; H04N 21/23805; H04N 21/8456
See application file for complete search history.

(56) References Cited

U.S. PATENT DOCUMENTS

| | | | | |
|---|---|---|---|---|
| 10,148,716 | B1* | 12/2018 | Joseph | H04L 65/60 |
| 10,992,721 | B2* | 4/2021 | Andersson | H04L 65/602 |
| 2013/0223509 | A1* | 8/2013 | Tweedale | H04N 21/8456 375/E7.026 |
| 2014/0130115 | A1* | 5/2014 | Losev | H04L 65/4084 725/116 |
| 2014/0149557 | A1* | 5/2014 | Lohmar | H04L 65/60 709/219 |
| 2014/0215536 | A1* | 7/2014 | Maxwell | H04N 21/845 725/87 |
| 2014/0317234 | A1* | 10/2014 | Mueller | H04L 67/02 709/217 |
| 2015/0156243 | A1* | 6/2015 | Skog | H04W 72/044 709/219 |
| 2017/0054775 | A1 | 2/2017 | Andersson et al. | |
| 2017/0147587 | A1* | 5/2017 | Xue | H04N 21/8133 |
| 2017/0359628 | A1* | 12/2017 | Sachdev | H04N 21/44016 |
| 2018/0220170 | A1 | 8/2018 | Yu | |
| 2019/0014358 | A1 | 1/2019 | Takabayashi et al. | |
| 2021/0051350 | A1 | 2/2021 | Zhou et al. | |

FOREIGN PATENT DOCUMENTS

| | | |
|---|---|---|
| CN | 105744342 A | 7/2016 |
| CN | 106454395 A | 2/2017 |
| CN | 109040801 A | 12/2018 |
| CN | 109769125 A | 5/2019 |
| CN | 110267100 A | 9/2019 |
| CN | 110290402 A | 9/2019 |
| CN | 110636346 A | 12/2019 |
| JP | 2006180236 A | * 7/2006 |
| JP | 2013214799 A | 10/2013 |
| WO | 2018133601 | 7/2018 |

OTHER PUBLICATIONS

International Search Report of the International Searching Authority for State Intellectual Property Office of the People's Republic of China in PCT application No. PCT/CN2020/131840 dated Mar. 4, 2021, which is an International application corresponding to this U.S. application.

Revised text of ISO/IEC FDIS 23009-1 3rd edition, 125. MPEG Meeting; Marrakech; (Motion Picture Expert Group or ISO/IEC JTC1/SC29/WG11), sections I.3.4 and I.3.5, Jan. 18, 2019.

The State Intellectual Property Office of People's Republic of China, Second Office Action in Patent Application No. CN202010054781.8 dated May 19, 2022, which is a foreign counterpart application corresponding to this U.S. Patent Application, to which this application claims priority.

The Hague, Extended European Search Report Communication Pursuant to Rule 62 EPC, dated May 30, 2022 in Patent Application No. EP 20914247.0, which is a foreign counterpart application to which this application claims priority.

Communication pursuant to Article 94(3) EPC of European application No. 20914247.0 dated Jun. 10, 2022.

* cited by examiner

METHOD FOR TRANSMITTING MULTIMEDIA RESOURCE AND TERMINAL

CROSS-REFERENCE TO RELATED APPLICATION

The present disclosure is a continuation application of International Application No. PCT/CN2020/131840, filed on Nov. 26, 2020, which claims priority to Chinese Patent Application No. 202010054781.8, filed on Jan. 17, 2020 and entitled "METHOD FOR TRANSMITTING A MULTIMEDIA RESOURCE AND APPARATUS, TERMINAL AND STORAGE MEDIUM." Both applications are herein incorporated by reference in their entireties.

TECHNICAL FIELD

The present disclosure relates to technical field of communications, and in particular, to a method for transmitting a multimedia resource, a terminal and a storage medium.

BACKGROUND

With the development of communication technologies, users can browse audio and video resources on terminals. At present, when a server transmits audio and video resources to a terminal (commonly known as a "stream pulling phase"), a fragmentation-based media transmission method is used.

SUMMARY

According to an aspect of embodiments of the present disclosure, a method for transmitting a multimedia resource is provided, including: determining target address information based on a media presentation description of a multimedia resource, where the media presentation description includes address information of the multimedia resource having different code rates, and the target address information is address information of a multimedia resource having a target code rate; and sending a frame acquiring request carrying the target address information to a server, where the frame acquiring request is configured to instruct the server to return media frames of the multimedia resource at the target code rate.

According to another aspect of the embodiments of the present disclosure, a terminal is provided, including: at least one processor; and at least one memory configured to store an instruction executable by the at least one processor, wherein the at least one processor is configured to perform the following operations: determining target address information based on a media presentation description of a multimedia resource, where the media presentation description includes address information of the multimedia resource having different code rates, and the target address information is address information of the multimedia resource having a target code rate; and sending a frame acquiring request carrying the target address information to a server, where the frame acquiring request is configured to instruct the server to return media frames of the multimedia resource at the target code rate.

According to another aspect of the embodiments of the present disclosure, a storage medium is provided, wherein at least one instruction in the storage medium, when executed by at least one processor of a terminal, causes the terminal to perform the following operations: determining target address information based on a media presentation description of a multimedia resource, where the media presentation description includes address information of the multimedia resource having different code rates, and the target address information is address information of the multimedia resource having a target code rate; and sending a frame acquiring request carrying the target address information to a server, where the frame acquiring request is configured to instruct the server to return media frames of the multimedia resource at the target code rate.

DETAILED DESCRIPTION

The fragmentation-based media transmission method includes common Dynamic Adaptive Streaming over HTTP (DASH for short, a standard developed by MPEG (Moving Picture Experts Group) for HTTP-based adaptive streaming media transmission), HTTP Live Streaming (HLS for short, a standard developed by Apple Inc. for HTTP-based adaptive streaming media transmission), etc. The server divides audio and video resources into audio and video fragments, each of which can be transcoded to have different code rates. When playing the audio and video resources, the terminal accesses URLs of the audio and video fragments divided from the audio and video resources. Different audio and video fragments can correspond to same or different code rates, so that the terminal can easily switch between audio and video resources of different code rates. This process is also known as adaptive code rate adjustment based on bandwidth conditions of the terminal itself.

The present disclosure provides a method for transmitting a multimedia resource, a terminal and a storage medium. The technical solution of the present disclosure is as follows.

The terms in the present disclosure are illustrated hereinafter.

I. FLV (Flash Video)

FLV is a streaming media format, which is a video format developed with the introduction of Flash MX (an animation software). An extremely small file size and an extremely fast loading speed make it possible to watch a video file on the network (i.e., to view videos online). The development of FLV effectively solves the problem that a SWF (a dedicated file format for Flash) file, which is exported after Flash is imported to a video file, has a large size and cannot be used on the network desirably.

II. Streaming Media

Streaming media adopts a streaming method, which refers to a technology and process of compressing a sequence of multimedia resources and sending resource packets over the Internet, so as to transmit the multimedia resources in real time on the Internet for viewing. This technology allows resource packets to be sent like running water. In a case that this technology is not used, the entire media file needs to be downloaded before use, and the multimedia resources can only be watched offline. Streaming can deliver live multimedia resources or multimedia resources pre-stored on a server. When a viewer user watches the multimedia resources, the multimedia resources are played by a specific play software after reaching a viewer terminal of the viewer user.

III. FLV Adaptive Streaming (FAS)

FAS is a streaming resource transmission standard (also known as resource transmission protocol) proposed in the present disclosure. Unlike the traditional fragmentation-based media transmission method, the FAS standard can achieve frame-level multimedia resource transmission. Instead of waiting for a complete video segment to arrive before sending resource packets to the terminal, the server determines a target timestamp after parsing a frame acquiring request from a terminal; in a case that the target timestamp is less than zero, the server packets all media frames already cached starting from the target timestamp and sends the media frames to the terminal (without fragmentation). Thereafter, in a case that the target timestamp is greater than or equal to zero or there is a real-time stream in addition to the cached media frames, the server sends media frames of the multimedia resource to the terminal frame by frame. It should be noted that a target code rate is specified in the frame acquiring request. In a case that the network bandwidth condition of the terminal changes, the terminal can adaptively adjust a to-be-switched code rate, and resend a frame acquiring request corresponding to the to-be-switched code rate, to achieve an effect of adaptively adjusting the code rate of the multimedia resource. The FAS standard can achieve frame-level transmission and reduce end-to-end delay. A new frame acquiring request is sent only when the code rate is switched, which greatly reduces the number of requests and reduces the communication overheads in the resource transmission process.

IV. Live Streaming and On-Demand Streaming

Live streaming: multimedia resources are recorded in real time, and an anchor user "pushes" a media stream (which means pushing a multimedia resource in a streaming manner) to a server through an anchor terminal, and a viewer user triggers, on a viewer terminal, to enter a live streaming interface of the anchor user, and then "pulls" the media stream (which means pulling the multimedia resource in a streaming manner) from the server to the viewer terminal. The viewer terminal decodes and plays the multimedia resource, and thus plays the video in real time.

On-demand streaming: also known as Video On Demand (VOD). Multimedia resources are pre-stored on a server, and according to a requirement of a viewer user, the server provides a multimedia resource specified by the viewer user. In some embodiments, a viewer terminal sends a VOD request to the server, and the server sends a multimedia resource to the viewer terminal after querying the multimedia resource specified in the VOD request, that is, the viewer user can selectively play a particular multimedia resource.

It is possible to control play progress of content of VOD arbitrarily, but not content of live streaming, where the play speed of the live streaming content depends on the real-time live streaming progress of the anchor user.

Figure 1:
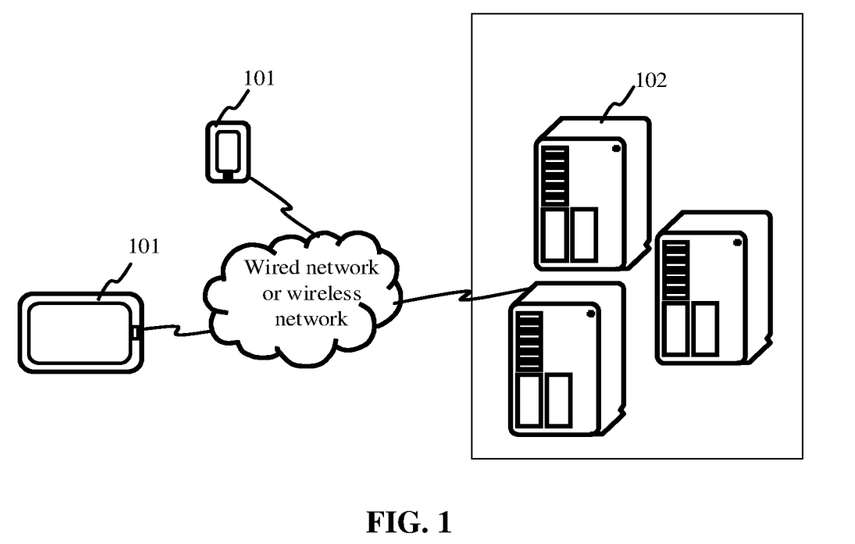
FIG. 1 is a schematic diagram of an implementation environment of a method for transmitting a multimedia resource according to an embodiment.

FIG. 1 is a schematic diagram of an implementation environment of a method for transmitting a multimedia resource according to an embodiment. Referring to FIG. 1, the implementation environment includes: at least one terminal 101 and a server 102, which are described in detail below.

In some embodiments, the terminal 101 is configured to transmit multimedia resources. A media codec component and a media play component may be installed on each terminal. The media codec component is configured to decode a multimedia resource after receiving the multimedia resource (e.g., resource packets transmitted in fragments, and media frames transmitted at a frame level), and the media play component is configured to play the multimedia resource after the multimedia resource is decoded.

According to different user identities, the terminals 101 may be classified into an anchor terminal and a viewer terminal. The anchor terminal corresponds to an anchor user and the viewer terminal corresponds to a viewer user. It should be noted that, one terminal can be either an anchor terminal or a viewer terminal. For example, the terminal is an anchor terminal when the user is recording a live stream, and is a viewer terminal when the user is watching a live stream.

The terminal 101 and the server 102 may be connected via a wired network or a wireless network.

In some embodiments, the server 102 is configured to provide a multimedia resource to be transmitted. The server 102 includes at least one of the following: a server, a plurality of servers, a cloud computing platform, or a virtualization center. In some embodiments, the server 102 undertakes primary computing and the terminal 101 undertakes secondary computing; or, the server 102 undertakes secondary computing and the terminal 101 undertakes primary computing; or, a distributed computing architecture is used between the terminal 101 and the server 102 to perform collaborative computing.

In some embodiments, the server 102 may be a cluster Content Delivery Network (CDN) server, and the CDN server includes a central platform and edge servers deployed at different locations. Through load balancing, content distribution, dispatching and other functional modules of the central platform, a terminal where the user is located can acquire required content (i.e., multimedia resource) nearby relying on a local edge server. The CDN server adds a caching mechanism between the terminal and the central platform. The caching mechanism refers to edge servers (such as WEB servers) deployed at different geographical locations. In performance optimization, the central platform will dispatch an edge server nearest to the terminal to serve the terminal according to distances between the terminal and the edge servers, to release content to the terminal more efficiently.

The multimedia resource in embodiments of the present disclosure includes, but is not limited to, at least one of the following: video resource, audio resource, image resource, or text resource, which is not limited in embodiments of the present disclosure. For example, the multimedia resource is a live video stream of a network anchor, or a historical on-demand video pre-stored on a server, or a live audio stream of a radio anchor, or a historical on-demand audio pre-stored on a server.

In some embodiments, the device type of the terminal 101 includes, but is not limited to, at least one of the following: a television, a smartphone, a smart speaker, a vehicle terminal, a tablet computer, an e-book reader, a Moving Picture Experts Group Audio Layer III (MP3) player, a Moving Picture Experts Group Audio Layer IV (MP4) player, a laptop computer, or a desktop computer. In the following embodiments, the terminal 101 including a smartphone is used as an example for description.

There may be only one terminal 101, or there may be tens of or hundreds of terminals 101, or more. The number and the device types of the terminals 101 are not limited in the embodiments of the present disclosure.

Figure 2:
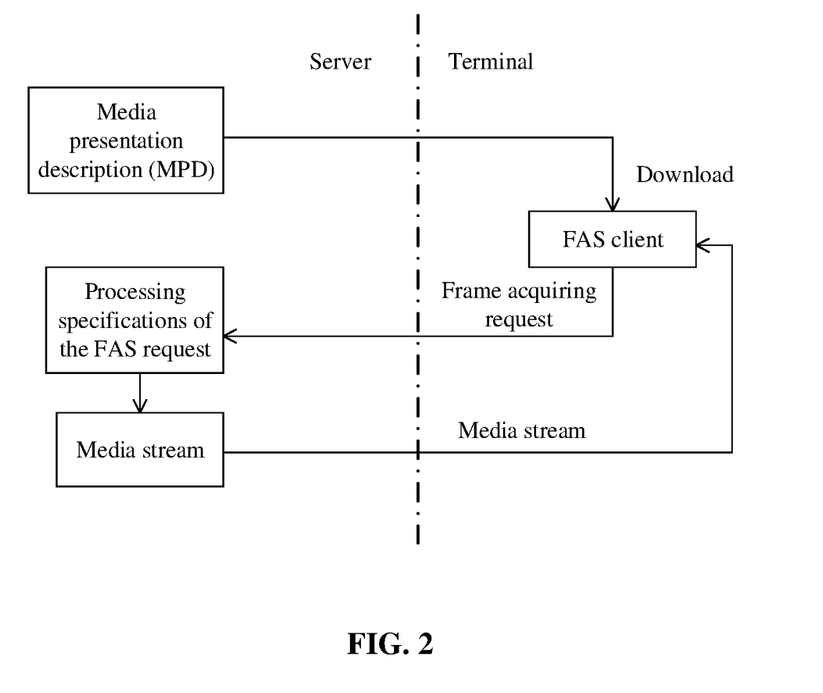
FIG. 2 is a schematic diagram of an FLY Adaptive Streaming (FAS) framework according to an embodiment of the present disclosure.

FIG. 2 is a principle schematic diagram of a FAS framework according to an embodiment of the present disclosure. As shown in FIG. 2, in a FAS (streaming-based multi-bitrate adaptive) framework, multimedia resources are transmitted between the terminal 101 and the server 102 based on a FAS protocol.

Any one of the terminals is used as an example for description. An application (also known as a FAS client) may be installed on the terminal. The application is used for browsing multimedia resources. For example, the application is a short video application, a live streaming application, a video-on-demand application, a social application, a shopping application, etc., which is not limited in embodiments of the present disclosure.

A user starts the application on the terminal and the terminal displays a resource push interface (e.g., a home page or a functional interface of the application). The resource push interface includes thumbnail information of at least one multimedia resource. The thumbnail information includes at least one of the following: a title, an introduction, a publisher, a poster, a trailer, or a highlight clip. In response to the user's touch operation on the thumbnail information of any multimedia resource, the terminal may redirect from the resource push interface to a resource play interface. The resource play interface includes a play option for the multimedia resource. In response to the user's touch operation on the play option, the terminal downloads a media presentation description (MPD) of the multimedia resource from the server. Based on the media presentation description, the terminal determines target address information which is address information of the multimedia resource having a target code rate, and sends a frame acquiring request (or known as a FAS request) carrying the target address information to the server, such that the server processes the frame acquiring request based on certain specifications (processing specifications of the FAS request). After locating media frames of the multimedia resource (consecutive media frames form a media stream), the server returns the media frames of the multimedia resource to the terminal at the target code rate (i.e., the server returns the media stream to the terminal at the target code rate). After receiving the media stream, the terminal invokes the media codec component to decode the media stream to obtain a decoded media stream, and invokes the media play component to play the decoded media stream.

In some live streaming scenarios, the media stream requested by the terminal is a live video stream pushed by an anchor user to the server in real time. In this case, the server transcodes the live video stream after receiving the live video stream of the anchor user to obtain the live video stream having a plurality of code rates, assigns different address information to the live video stream with different code rates, and records the address information in the media presentation description, thus the server can return the corresponding live video stream at different code rates for frame acquiring requests carrying different address information.

Further, a mechanism for adaptive code rate adjustment is provided. When the current network bandwidth condition of the terminal changes, the to-be-switched code rate matching the current network bandwidth condition is adaptively adjusted accordingly. For example, when the code rate needs to be switched, the terminal disconnects the media streaming link at the current code rate and sends, to the server, a frame acquiring request carrying to-be-switched address information which corresponds to the to-be-switched code rate, and establishes a media streaming link based on the to-be-switched code rate. Certainly, the terminal can directly re-initiate a frame acquiring request carrying the to-be-switched address information without disconnecting the media streaming link of the current code rate, establish a media streaming link based on the to-be-switched code rate (for transmission of a new media stream), and use the original media stream as a standby stream. Once the transmission of the new media stream is abnormal, the terminal may continue to play the standby stream.

Figure 3:
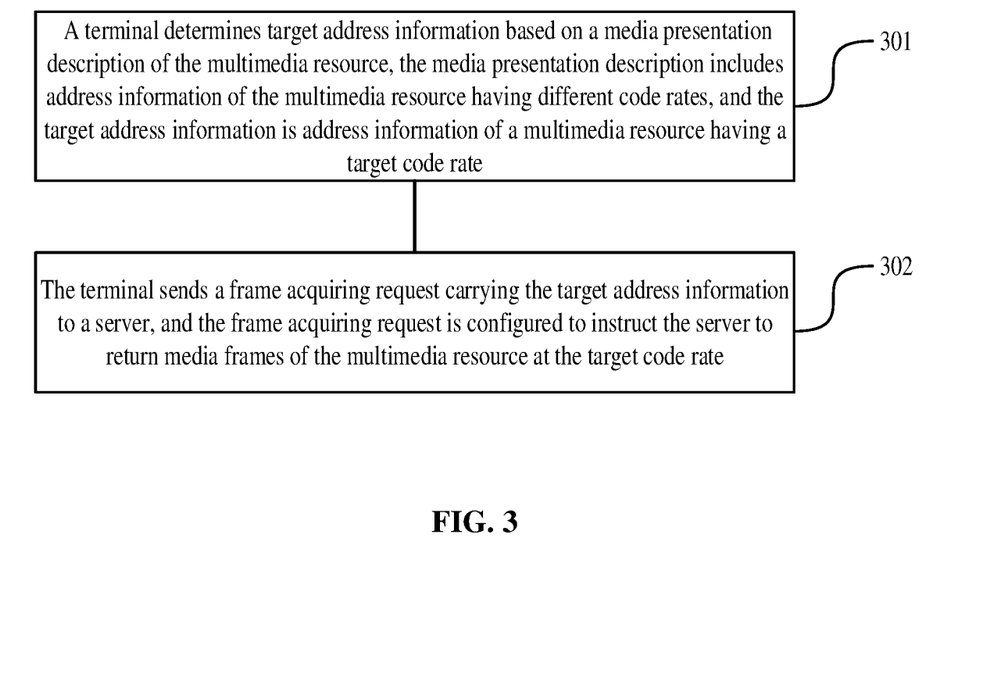
FIG. 3 is a flowchart of a method for transmitting a multimedia resource according to an embodiment.

FIG. 3 is a flowchart of a method for transmitting a multimedia resource according to an embodiment. The method for transmitting a multimedia resource is performed by a terminal in the FAS framework in the implementation environment described above.

In 301, the terminal determines target address information based on a media presentation description of the multimedia resource. The media presentation description includes address information of the multimedia resource having different code rates, and the target address information is address information of the multimedia resource having a target code rate.

In 302, the terminal sends a frame acquiring request carrying the target address information to a server. The frame acquiring request is configured to instruct the server to return media frames of the multimedia resource at the target code rate.

In some embodiments, the terminal determines the target address information as follows:

the terminal determines the target code rate; and the terminal acquires the target address information from the address information in the media presentation description based on the target code rate.

In some embodiments, the terminal determines the target code rate as follows: in response to a code rate selection instruction, the terminal determines a value carried by the code rate selection instruction as the target code rate.

In some embodiments, the terminal determines the target code rate as follows: the terminal adjusts the target code rate to be a code rate corresponding to current network bandwidth information.

In some embodiments, the terminal determines the target code rate as follows: the terminal adjusts the target code rate to be the code rate corresponding to current network bandwidth information through an adaptation function.

In embodiments, the method further includes:

determining a to-be-switched code rate in response to a code rate switching instruction;

acquiring to-be-switched address information from the address information in the media presentation description, in which the to-be-switched address information is address information of the multimedia resource having the to-be-switched code rate; and sending a frame acquiring request carrying the to-be-switched address information to the server.

In some embodiments, the frame acquiring request further carries at least one of a first extended parameter or a second extended parameter, the first extended parameter indicates whether the media frames are audio frames, and the second extended parameter indicates a target timestamp from which transmission of the media frames of the multimedia resource starts. For example, the frame acquiring request only includes the first extended parameter, or the frame acquiring request only includes the second extended parameter, or the frame acquiring request includes both the first extended parameter and the second extended parameter.

In some embodiments, the target timestamp is later than a current moment in a case that the second extended parameter is greater than zero.

The target timestamp is a timestamp of a keyframe or an audio frame closest to the current moment in a case that the second extended parameter is equal to zero.

The target timestamp is earlier than the current moment and the media frames include media frames already cached starting from the target timestamp, in a case that the second extended parameter is less than zero.

In some embodiments, the media presentation description includes a version number and a media description set. The version number includes at least one of a version number of the media presentation description or a version number of a resource transmission standard. The media description set includes multiple pieces of media description meta-information, each piece of media description meta-information corresponds to the multimedia resource at a code rate, and each piece of media description meta-information includes a length of a group of pictures and attribute information of the multimedia resource corresponding to the media description meta-information. The version number only includes the version number of the media presentation description, or the version number only includes the version number of the resource transmission standard, or the version number includes both the version number of the media presentation description and the version number of the resource transmission standard.

In some embodiments, each piece of attribute information includes identification information of the multimedia resource, an encoding mode of the multimedia resource, a code rate supported by the multimedia resource, and address information of the multimedia resource at the code rate.

In some embodiments, each piece of attribute information further includes at least one of the following: a quality type of the multimedia resource, a hide option of the multimedia resource, a first adaptation function option, or a default play function option, where the first adaptation function option indicates whether the multimedia resource is visible relative to an adaptation function. For example, in addition to the identification information of the multimedia resource, the encoding mode of the multimedia resource, the code rate supported by the multimedia resource, and the address information of the multimedia resource at the code rate, each piece of attribute information further includes at least one of the following: the quality type of the multimedia resource, the hide option of the multimedia resource, the first adaptation function option, or the default play function option, or further includes a combination of at least two of the following: the quality type of the multimedia resource, the hide option of the multimedia resource, the first adaptation function option, or the default play function option.

In some embodiments, the media presentation description further includes at least one of the following: a service type, a second adaptation function option or a third adaptation function option, where the service type includes at least one of live streaming or video on demand, the second adaptation function option indicates whether to activate an adaptation function, and the third adaptation function option indicates whether to activate the adaptation function by default at the beginning of play. For example, in addition to the version number and the media description set, the media presentation description further includes any of the following: the service type, the second adaptation function option or the third adaptation function option, or further includes a combination of at least two of the following: the service type, the second adaptation function option, and the third adaptation function option.

Figure 4:
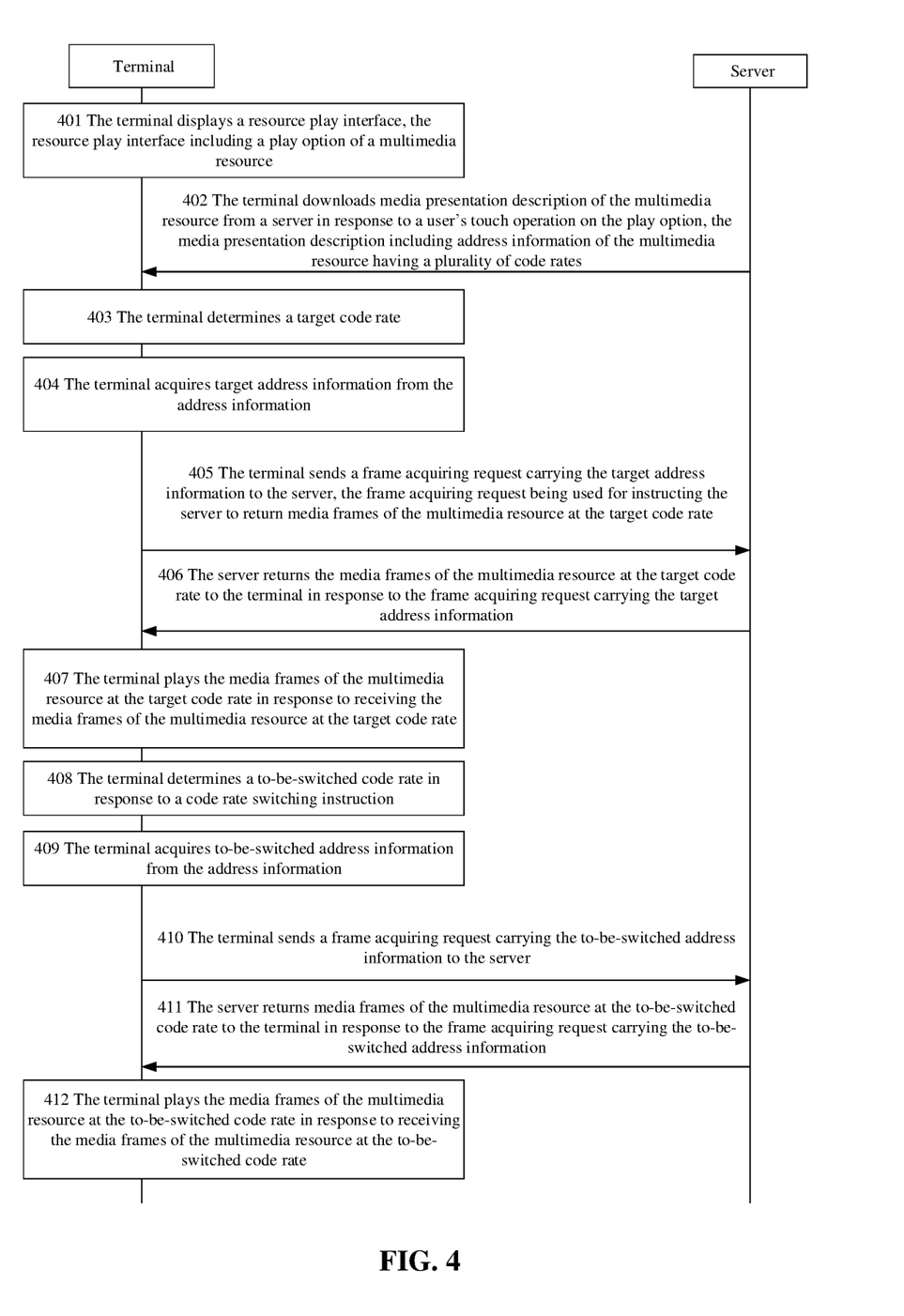
FIG. 4 is an interaction flowchart of a method for transmitting a multimedia resource according to an embodiment.

FIG. 4 is an interaction flowchart of a method for transmitting a multimedia resource according to an embodiment. The method may be applied to the FAS framework in the implementation environment described above. The method may include the followings.

In 401, a terminal displays a resource play interface. The resource play interface includes a play option of a multimedia resource.

An application, configured for browsing multimedia resources, is installed on the terminal. For example, the application includes at least one of the following: a short video application, a live streaming application, a video-on-demand application, a social application, a shopping application, etc., which are not limited in embodiments of the present disclosure.

The multimedia resource in embodiments of the present disclosure includes, but is not limited to, at least one of the following: video resource, audio resource, image resource, or text resource. For example, the multimedia resource is a live video stream of a network anchor, or a historical on-demand video pre-stored on a server, or a live audio stream of a radio anchor, or a historical on-demand audio pre-stored on a server.

In the foregoing process, a user starts the application which displays a resource push interface on the terminal. For example, the resource push interface is a home page or a functional interface of the application, which is not specifically limited in embodiments of the present disclosure. The resource push interface includes thumbnail information of at least one multimedia resource. The thumbnail information includes at least one of the following: a title, an introduction, a poster, a trailer, or a highlight clip of the multimedia resource. In the process of browsing the resource push interface, the user may click on the thumbnail information of a multimedia resource of interest. In response to the user's touch operation on the thumbnail information of the multimedia resource, the terminal redirects from the resource push interface to a resource play interface.

The resource play interface may include a play area and a comment area. The play area may include a play option for the multimedia resource, and the comment area may include viewing comments made by other users on the multimedia resource.

In some embodiments, the play area also includes detail information of the multimedia resource. The detail information includes at least one of the following: a title, an introduction, keywords, publisher information, or current popularity of the multimedia resource. The publisher information includes a nickname, an avatar, and a number of followers, and so on of the publisher, which are not limited in embodiments of the present disclosure.

In some embodiments, the play area also includes a bullet comments input area and a bullet comments setting option. Through the bullet comments setting option, the user controls at least one of the following: whether to display bullet comments, a movement speed, a display area or a display mode (such as transparency and font size) of the bullet comments. The user can also input comment content by clicking on the bullet comments input area, and the form of the bullet comments is not limited to text or emoticon images. The content of the bullet comments setting option or the form of the bullet comments entered by the user are not limited in embodiments of the present disclosure.

In some embodiments, the play area also includes a favorite option and a follow option. By clicking on the favorite option, the user triggers the terminal to send a favorite request to the server. In response to the favorite request, the server adds the multimedia resource to corresponding favorites of the user and then the favorite displayed by the terminal includes the multimedia resource. For example, the favorite request carries user identification corresponding to the user and identification information of the multimedia resource, and the server adds the multimedia resource corresponding to the identification information into the favorite corresponding to the user identification. By clicking on the follow option, the user triggers the terminal to send a follow request to the server. In response to the follow request, the server adds the publisher of the multimedia resource to a follow list corresponding to the user and the follow list displayed by the terminal includes the publisher.

In some embodiments, the play area also includes a gift option for virtual gifts. The user clicks on the gift option, the terminal displays a selection bar for categories of virtual gifts and a gift quantity. After selecting a category and a quantity of virtual gifts, the user triggers the terminal to send a virtual gift giving request to the server by clicking on a confirmation button. The server settles the virtual gift giving request by deducting a certain value from the user's account and issuing a certain value to the anchor's account. After the settlement is completed, the terminal displays a special effect animation of the virtual gift in a floating manner in the play area.

The various possible implementations described above provide different layouts of the resource play interface, and the resource play interface has more or fewer layout manners in practical application. The layout manner of the resource play interface is not limited in embodiments of the present disclosure.

In 402, the terminal downloads media presentation description of the multimedia resource from a server in response to a user's touch operation on the play option. The media presentation description includes address information of the multimedia resource having a plurality of code rates.

In the above process, since the user may pause the play of the multimedia resource and then click on the play option to trigger play again during the play process, the terminal can download the media presentation description of the multimedia resource only when the user clicks on the play option for the first time. Or, considering the media presentation description may change and cause version changes, the terminal can also download the media presentation description again every time the user clicks on the play option. The timing for downloading the media presentation description is not limited in embodiments of the present disclosure.

In some embodiments, the media presentation description is a file in the format of JavaScript Object Notation (JSON). The format of the media presentation description is not limited in embodiments of the present disclosure. The media presentation description may include a version number (@version) and a media description set (@adaptationSet), which are described in detail below.

In some embodiments, the media presentation description itself may generate different versions due to changes in the transcoding mode, and the FAS standard will also change versions with the development of the technology. Therefore, the version number includes at least one of a version number of the media presentation description or a version number of a resource transmission standard (FAS standard). For example, the version number only includes the version number of the FAS standard, or only includes the version number of the media presentation description, or the version number also is a combination of the version number of the media presentation description and the version number of the FAS standard.

In some embodiments, the media description set represents meta-information about multimedia resources. The media description set includes multiple pieces of media description meta-information. Each piece of media description meta-information corresponds to a multimedia resource at one code rate, and includes a length of a group of pictures (@gopDuration) and attribute information (@representation) of the multimedia resource which have the code rate corresponding to the media description meta-information.

The length of the group of pictures (GOP) herein refers to a distance between two keyframes. A keyframe is an intra-coded picture (also known as "I-frame") in a video coding sequence. The coding and decoding of the I-frame do not need to refer to other image frames and can be implemented using only information of the I-frame itself. In contrast, the coding and decoding of a predictive-coded picture (P-frame) and a bidirectionally predicted picture (B-frame) need to refer to other image frames, and cannot be implemented using only information of the frame itself.

In some embodiments, for the attribute information in each piece of media description meta-information (i.e., each piece of attribute information), each piece of attribute information includes identification information of the multimedia resource, an encoding mode of the multimedia resource, a code rate supported by the multimedia resource, and address information of the multimedia resource at the code rate.

Identification information (@id) refers to a unique identifier of each multimedia resource, where the identification information may be allocated by the server.

Encoding mode (@codec) refers to a codec standard to be followed by the multimedia resource, e.g., H.263, H.264, H.265, or MPEG.

Code rate (@bitrate) supported by the multimedia resource refers to data bits transmitted per unit time during resource transmission, which is also called as bit rate. Using an audio resource as an example, the higher the code rate, the smaller the compression proportion of the audio resource; and the smaller loss of sound quality, the closer to the sound quality of the audio source (the better sound quality). This also applies to a video resource. However, since the video resource is formed by an image resource and an audio resource, the corresponding image resource should be taken into consideration in addition to the audio resource during calculation of the code rate.

Address information of the multimedia resource at a certain code rate (@url) refers to a Uniform Resource Locator (URL) or a domain name of the multimedia resource at the code rate provided by the server to the external after transcoding the multimedia resource.

In some embodiments, each piece of attribute information further includes at least one of the following: a quality type of the multimedia resource, a hide option of the multimedia resource, a first adaptation function option, or a default play function option. For example, in addition to the identification information of the multimedia resource, the encoding mode of the multimedia resource, the code rate supported by the multimedia resource, and the address information of the multimedia resource at the code rate, each piece of attribute information further includes at least one of the following: a quality type of the multimedia resource, a hide option of the multimedia resource, a first adaptation function option, or a default play function option, or further includes a combination of at least two of the following: the quality type of the multimedia resource, a hide option of the multimedia resource, the first adaptation function option, or the default play function option.

Quality type (@qualityType) includes a resolution, a frame rate or other quality evaluation indicators of the multimedia resource.

Hide option of the multimedia resource (@hiden) indicates whether the multimedia resource is presented. If the hide option is set to true, the multimedia resource at a corresponding code rate is not presented, that is, the terminal does not display the multimedia resource corresponding to each code rate. In this case, the multimedia resource at the corresponding code rate cannot be selected by the user manually but can only be selected through an adaptation function. If the hide option is set to false, the multimedia resource at the corresponding code rate is presented, that is, the terminal displays the multimedia resource corresponding to each code rate. In this case, in addition to being selected through the adaptation function, the multimedia resource at the corresponding code rate can also be selected by the user manually. It should be noted that, the adaptation function in the present disclosure means a function of dynamically adjusting a frame rate of a played media stream based on a current bandwidth condition by a terminal, which will not be elaborated here.

First adaptation function option (@enableAdaptive) indicates whether the multimedia resource is visible relative to an adaptation function. If the first adaptation function option is set to true, the multimedia resource at the corresponding code rate is visible relative to the adaptation function, and the multimedia resource at the corresponding code rate can be selected by the adaptation function. If the first adaptation function option is set to false, the multimedia resource at the corresponding code rate is invisible relative to the adaptation function, and the multimedia resource at the corresponding code rate cannot be selected by the adaptation function.

Default play function option (@defaultSelect) indicates whether the multimedia resource at the corresponding code rate is played by default at the start-up of the play. If the default play function option is set to true, the multimedia resource at the corresponding code rate is played by default at the start-up of the play. If the default play function option is set to false, the multimedia resource at the corresponding code rate is not played by default at the start-up of the play. Since the media play component cannot play multimedia resources at two code rates by default (there is a play conflict), in the attribute information of all the media description meta-information, there can only be at most one code rate of the multimedia resource whose default play function option (@defaultSelect) is true.

In some embodiments, in addition to the version number and the media description set, the media presentation description may further include at least one of the following: a service type, a second adaptation function option, or a third adaptation function option. For example, the media presentation description further includes any one of the following: the service type, the second adaptation function option, or the third adaptation function option, or may further include a combination of at least two of the following: the service type, the second adaptation function option, or the third adaptation function option.

Service type (@type) is used for specifying a service type of the multimedia resource, including at least one of live streaming or video on demand. For example, when the service type is set to "dynamic", it indicates the live streaming, and when the service type is set to "static", it indicates the video on demand. Without particular specification, "dynamic" is used as a default value.

Second adaptation function option (@hideAuto) indicates whether to enable the adaptation function. If the second adaptation function option is set to false, the adaptation function is disabled and an adaptation option is not displayed; and if the second adaptation function option is set to true, the adaptation function is enabled and the adaptation option is displayed. Without particular specification, "true" may be used as a default value.

Third adaptation function option (@autoDefaultSelect) indicates whether the adaptation function is enabled by default at the start-up of the play. If the third adaptation function option is set to true, play is based on the adaptation function by default at the beginning of the play (start-up of the play). If the third adaptation function option is set to false, play is not based on the adaptation function by default at the beginning of the play, that is, the adaptation function is disabled by default at the start-up of the play. It should be noted that, the third adaptation function option herein is the premise of the foregoing default play function option, that is, the default play function option takes effect only when the third adaptation function option is set to false (the adaptation function is disabled by default at the start-up of the play). In this case, the multimedia resource corresponding to the code rate for which @defaultSelect is set to true is played by default at the start-up of the play. Otherwise, in a case that the third adaptation function option is set to true, the multimedia resource with a code rate most suitable for the current network bandwidth condition will be selected according to the adaptation function at the start-up of the play.

The media presentation description is a data file provided by the server to the terminal based on service requirements. The server pre-configures, based on the service requirements, a set of data and service-related description for providing a media streaming service to the terminal. The media presentation description includes an encoded media stream that can be transmitted and corresponding meta-information description, such that the terminal can construct a frame acquiring request (FAS request) based on the media presentation description. Then the server responds to the frame acquiring request according to processing specifications of the FAS standard, and provides the media streaming service to the server.

In 403, the terminal determines a target code rate.

The target code rate refers to a code rate of the currently requested multimedia resource. According to different service scenarios, in a case that the user plays the multimedia resource for the first time, the target code rate refers to a code rate at the start-up of the play. In a case that the user chooses to switch the code rate during the play process or the terminal adjusts the code rate based on an adaptive policy, the target code rate is a to-be-switched code rate.

In some embodiments, the terminal provides a code rate selection list to the user. When the user clicks on any value in the code rate selection list, a code rate selection instruction carrying the value is triggered to be generated. In response to the code rate selection instruction, the terminal determines the value carried by the code rate selection instruction as the target code rate.

In some embodiments, the terminal further adjusts the target code rate to be a code rate corresponding to the current network bandwidth information through the adaptation function. For example, in a case that the adaptation function is enabled, the target code rate is adjusted to be a code rate corresponding to the current network bandwidth information. During the adaptive adjustment process, in addition to the current network bandwidth information, play state information of the terminal may also be taken into consideration to dynamically select a target code rate with an optimal play effect. The play state information refers to whether the multimedia resource is frozen during the play. For example, being frozen during the play indicates that the multimedia resource is playing in a poor state and the code rate may be not decreased in order to make the video play smoother.

In 404, the terminal acquires target address information from the address information of the multimedia resource having different code rates in the media presentation description based on the target code rate, in which the target address information is address information of the multimedia resource having the target code rate from the address information.

In the above process, after determining the target code rate, the terminal queries the media presentation description by using the target code rate as an index, obtains media description meta-information corresponding to the multimedia resource having the target code rate, and extracts the target address information stored in the @url field from the attribute information of the media description meta-information.

In 403 to 404 above, the terminal determines the target address information of the multimedia resource having the target code rate based on the media presentation description of the multimedia resource.

In 405, the terminal sends a frame acquiring request carrying the target address information to a server, in which the frame acquiring request is configured to instruct the server to return media frames of the multimedia resource at the target code rate.

In the above process, after acquiring the target address information from the media presentation description, the terminal generates the frame acquiring request carrying the target address information, and then sends the frame acquiring request carrying the target address information to the server.

In some embodiments, in addition to the target address information (@url), the frame acquiring request further carries an extended parameter (@extParam). The extended parameter is configured to specify different requesting manners for implementing different functions. The extended parameter includes at least one of a first extended parameter or a second extended parameter, which will be described in detail below.

The first extended parameter (@onlyAudio) is an audio parameter for indicating whether the media frames are audio frames. If the first extended parameter is set to true, it means that the media frames pulled by the terminal are audio frames, i.e., the terminal only pulls a pure audio stream. Otherwise, if the first extended parameter is set to false, it means that media frames pulled by the terminal are audio and video frames, i.e., the terminal pulls both audio streams and video streams. Without particular specification, "false" can be used as a default value.

In some embodiments, the terminal can obtain the type of the multimedia resource. In a case that the type of the multimedia resource is video, the first extended parameter may be set to "false" or a default value. In a case that the type of the multimedia resource is audio, the first extended parameter may be set to "true".

In some embodiments, the terminal further detects the type of the application. In a case that the type of the application is video application, the first extended parameter may be set to "false" or a default value. In a case that the type of the application is audio application, the first extended parameter may be set to "true".

The second extended parameter (@fasSpts) is a pulling position parameter for indicating a target timestamp from which transmission of the media frames of the multimedia resource starts. In some embodiments, a data type of the second extended parameter is int64_t, or other data types. The data type of the second extended parameter is not limited in embodiments of the present disclosure. In some embodiments, the second extended parameter may be specified in the frame acquiring request. In a case that the second extended parameter is not specified by the frame acquiring request, the server configures a default value of the second extended parameter.

In some embodiments, in a case that the second extended parameter is greater than zero (@fasSpts>0), the target timestamp pts is later than a current moment, and the terminal starts pulling the media stream from a media frame whose pts is equal to @fasSpts (a future moment), that is, the server starts to transmit media stream from the media frame whose pts is equal to the @fasSpts to the terminal.

In some embodiments, in a case that the second extended parameter is equal to zero (@fasSpts=0), the target timestamp pts is a timestamp of a keyframe or an audio frame closest to the current moment. In some embodiments, when pulling audio frames (pure audio mode), the terminal starts pulling the media stream from the latest audio frame, or the server starts to transmit audio stream from the latest audio frame; when pulling audio and video frames (non-pure audio mode), the terminal starts pulling the media stream from the latest I-frame of the video, that is, the server starts to transmit media stream from the latest I-frame of the video to the terminal.

In some embodiments, in a case that the second extended parameter is less than zero (@fasSpts<0), the target timestamp is earlier than the current moment, and the media frames include media frames that have been cached since the target timestamp. That is, the terminal pulls a media stream which starts from the target timestamp and has a cache length of |@fasSpts| milliseconds, that is, the server transmits the media stream having a cache length of |@fasSpts| milliseconds since the target timestamp to the terminal.

In some embodiments, the terminal determines the second extended parameter based on a service type (@type) field in the multimedia presentation description. In a case that the service type obtained through query is "dynamic" (live streaming) and the user has not specified a play progress, the terminal may set the second extended parameter to 0. In a case that the service type obtained through query is "dynamic" (live streaming) and the user has specified the play progress, the terminal may set the second extended parameter to a timestamp (target timestamp) corresponding to the play progress. In a case that the service type obtained through query is "static" (video on demand) and the user has not specified the play progress, the terminal can detect a historical play progress of the multimedia resource when it was last closed and set the second extended parameter to a timestamp (target timestamp) corresponding to the historical play progress. It should be noted that in a case that the user watches the multimedia resource for the first time and does not find any historical play progress, the terminal can set the second extended parameter to a timestamp of the first media frame (target timestamp); in a case that the service type obtained through query is "static" (video on demand) and the user has specified the play progress, the terminal can set the second extended parameter to a timestamp corresponding to the play progress.

The format of the frame acquiring request can be considered to be the url address of the multimedia resource having the target code rate plus an extended field, which can be expressed figuratively as "url&extParam". In the FAS standard, after receiving the frame acquisition request, the server can respond to the frame acquiring request according to the processing specifications specified in the FAS, for the implementation of which, reference can be made to 406 below.

In 406, the server returns the media frames of the multimedia resource at the target code rate to the terminal in response to the frame acquiring request carrying the target address information.

In the above process, after receiving the frame acquiring request, the server may parse the frame acquiring request to obtain the target address information. Based on the target address information, the server locates the media frames of the multimedia resource having the target code rate in a resource library based on the target address information. In some embodiments, the multimedia resource having the target code rate is stored at the resource library, and the server locates the multimedia resource corresponding to the target address information in the resource library based on the target address information.

In some embodiments, in a case that the frame acquiring request further carries at least one of the first extended parameter or the second extended parameter, the server can further obtain at least one of the first extended parameter or the second extended parameter through parsing. In a case that the frame acquiring request does not carry at least one of the first extended parameter or the second extended parameter, the server may configure a default value of at least one of the first extended parameter or the second extended parameter. The server can determine the first extended parameter and the second extended parameter by parsing the frame acquiring request or configuring the default value. Further, the server determines, based on the first extended parameter, whether to send media frames in the audio form, and determines, based on the second extended parameter, a timestamp from which pulling of media frames is started. In this way, the server can return, starting from the target timestamp indicated by the second extended parameter, the media frames in the form indicated by the first extended parameter to the terminal at the target code rate. For example, the server determines the first extended parameter based on the type of the multimedia resource corresponding to the target address information in the frame acquiring request, i.e., the first extended parameter is set to "false" or the default value in a case that the multimedia resource is video, and the first extended parameter is set to "true" in a case that the type of the multimedia resource is audio; and the server sets the second extended parameter to 0 in a case that the service type corresponding to the multimedia resource is the live streaming, or, sets the second extended parameter to a timestamp of a first media frame in the multimedia resource in a case that the service type corresponding to the multimedia resource is the video on demand.

In some embodiments, in a case that the server is a CDN server, the target address information is a domain name. The terminal sends a frame acquiring request to a central platform of the CDN server. The central platform can obtain a CNAME (another name) record corresponding to a domain name by invoking a domain name system (DNS, which is essentially a domain name resolution library) to resolve the domain name. By resolving the CNAME record again based on geographic location information of the terminal, an Internet Protocol (IP) address of an edge server nearest to the terminal can be obtained. In this case, the central platform guides the frame acquiring request to the obtained edge server. In response to the frame acquiring request, the edge server provides the media frames of the multimedia resources to the terminal at the target code rate.

In 407, the terminal plays the media frames of the multimedia resource having the target code rate in response to receiving the media frames of the multimedia resource having the target code rate.

In the above process, in a case that the terminal receives the media frames of the multimedia resource having the target code rate (media frames received consecutively form a media stream), the terminal can store the media frames into the cache, invoke the media codec component to decode the media frames to obtain decoded media frames, and invoke the media play component to play the media frames in the cache in an ascending order of the timestamps (pts).

In the decoding process, the terminal can determine an encoding mode of the multimedia resource from the @codec field of the media presentation description, determine a corresponding decoding mode according to the encoding mode, and thus decode the media frames according to the determined decoding mode.

Since the frame acquiring request uses the "url&extParam" format, extended parameters can be defined to specify an audio parameter and a pulling position parameter. In a case that the code rate needs to be switched due to the change of the network condition, seamless switching of the code rate can be implemented through the following 408 to 412.

In 408, the terminal determines a to-be-switched code rate in response to a code rate switching instruction.

In some embodiment, the code rate switching instruction is triggered by the user in a code rate switching list. The terminal generates the code rate switching instruction in response to user's trigger operation to the code rates in the code rate switching list. In other embodiments, the code rate switching instruction may be automatically triggered by the terminal according to an adaptive policy. In a case that the adaptation function is enabled, the terminal determines whether the current code rate is required to be adjusted based on the current network bandwidth information, and the terminal generates the code rate switching instruction in a case that the current code rate is required to be adjusted. A trigger condition for the code rate switching instruction is not specifically limited in the embodiments of the present disclosure.

In some embodiments, in a case that the user triggers the code rate switching instruction in the code rate switching list, the terminal determines a code rate in the code rate switching list selected by the user as the to-be-switched code rate in response to the code rate switching instruction; or in a case that the terminal automatically triggers the code rate switching instruction according to an adaptive policy, the terminal determines a code rate corresponding to the current network bandwidth information as the to-be-switched code rate in response to the code rate switching instruction.

For 408, reference can be made to 403 above.

In 409, the terminal acquires to-be-switched address information from the address information of the multimedia resource having different code rates in the media presentation description, the to-be-switched address information being address information of the multimedia resource having the to-be-switched code rate.

For 409, reference can be made to 404 above.

In 410, the terminal sends a frame acquiring request carrying the to-be-switched address information to the server.

The frame acquiring request is used for instructing the server to return media frames of the multimedia resource at to-be-switched code rate.

For 410, reference can be made to 405 above.

In 411, the server returns media frames of the multimedia resource at the to-be-switched code rate to the terminal in response to the frame acquiring request carrying the to-be-switched address information.

For 411, reference can be made to 406 above.

In 412, the terminal plays the media frames of the multimedia resource having the to-be-switched code rate in response to receiving the media frames of the multimedia resource at the to-be-switched code rate.

For 412, reference can be made to 407 above.

Figure 5:
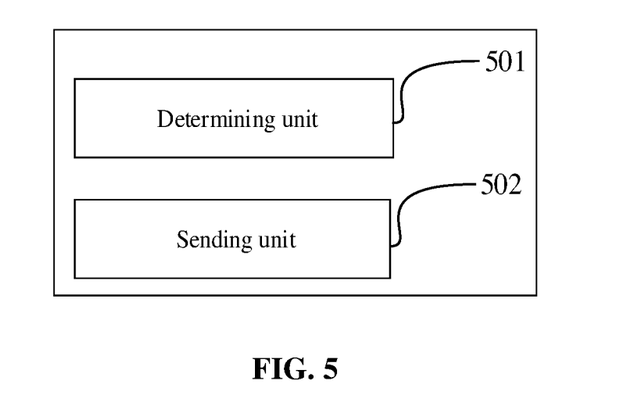
FIG. 5 is a block diagram of a logic structure of an apparatus for transmitting a multimedia resource according to an embodiment.

FIG. 5 is a block diagram of a logic structure of an apparatus for transmitting a multimedia resource according to an embodiment. The apparatus includes a determining unit 501 and a sending unit 502.

The determining unit 501 is configured to determine target address information based on a media presentation description of the multimedia resource, and the media presentation description includes address information of the multimedia resource having different code rates, and the target address information is address information of a multimedia resource having a target code rate.

The sending unit 502 is configured to send a frame acquiring request carrying the target address information to a server, and the frame acquiring request is used for instructing the server to return media frames of the multimedia resource at the target code rate.

In some embodiments, based on the composition of the apparatus shown in FIG. 5, the determining unit 501 further includes:

a determining subunit, configured to determine the target code rate; and an acquiring subunit, configured to acquire the target address information from the address information.

In some embodiments, the determining subunit is configured to:

determine a value carried by a code rate selection instruction as the target code rate in response to the code rate selection instruction; or adjust the target code rate to be a code rate corresponding to current network bandwidth information.

In some embodiments, the media presentation description includes a second adaptation function option. In a case that the second adaptation function option is at a first parameter, an adaptation function is in an enable state. The determining subunit is configured to adjust the target code rate to be a code rate corresponding to current network bandwidth information in a case that the adaptation function is enable.

In some embodiments, the determining unit 501 is further configured to: determine a to-be-switched code rate in response to a code rate switching instruction; and acquire to-be-switched address information from the address information, the to-be-switched address information being address information of the multimedia resource having the to-be-switched code rate; and the sending unit 502 is further configured to send a frame acquiring request carrying the to-be-switched address information to the server.

In some embodiments, the frame acquiring request further carries at least one of a first extended parameter or a second extended parameter, the first extended parameter indicates whether the media frames are audio frames, and the second extended parameter indicates that transmission of the media frames of the multimedia resource starts from a target timestamp which is indicated by the second extended parameter.

In some embodiments, the target timestamp is greater than a current moment in a case that the second extended parameter is greater than zero.

The target timestamp is a timestamp of a keyframe or an audio frame closest to the current moment in a case that the second extended parameter is equal to zero.

The target timestamp is less than the current moment and the media frames include media frames that have been cached since the target timestamp, in a case that the second extended parameter is less than zero.

In some embodiments, the media presentation description includes a version number and a media description set, the version number includes at least one of a version number of the media presentation description or a version number of a resource transmission standard, the media description set includes multiple pieces of media description meta-information, each piece of media description meta-information corresponds to the multimedia resource at a code rate, and each piece of media description meta-information includes a length of a group of pictures and attribute information, and the multimedia resource includes the code rate corresponding to the media description meta-information.

In some embodiments, each piece of attribute information includes identification information of the multimedia resource, an encoding mode of the multimedia resource, a code rate supported by the multimedia resource, and address information of the multimedia resource at the code rate.

In some embodiments, each piece of attribute information further includes at least one of the following: a quality type of the multimedia resource, a hide option of the multimedia resource, a first adaptation function option, or a default play function option, the first adaptation function option indicating whether the multimedia resource is visible relative to an adaptation function.

In some embodiments, the media presentation description further includes at least one of the following: a service type, a second adaptation function option or a third adaptation function option, the service type includes at least one of live streaming or video on demand, the second adaptation function option indicates whether to activate an adaptation function, and the third adaptation function option indicates whether to activate the adaptation function by default at the beginning of play.

Figure 6:
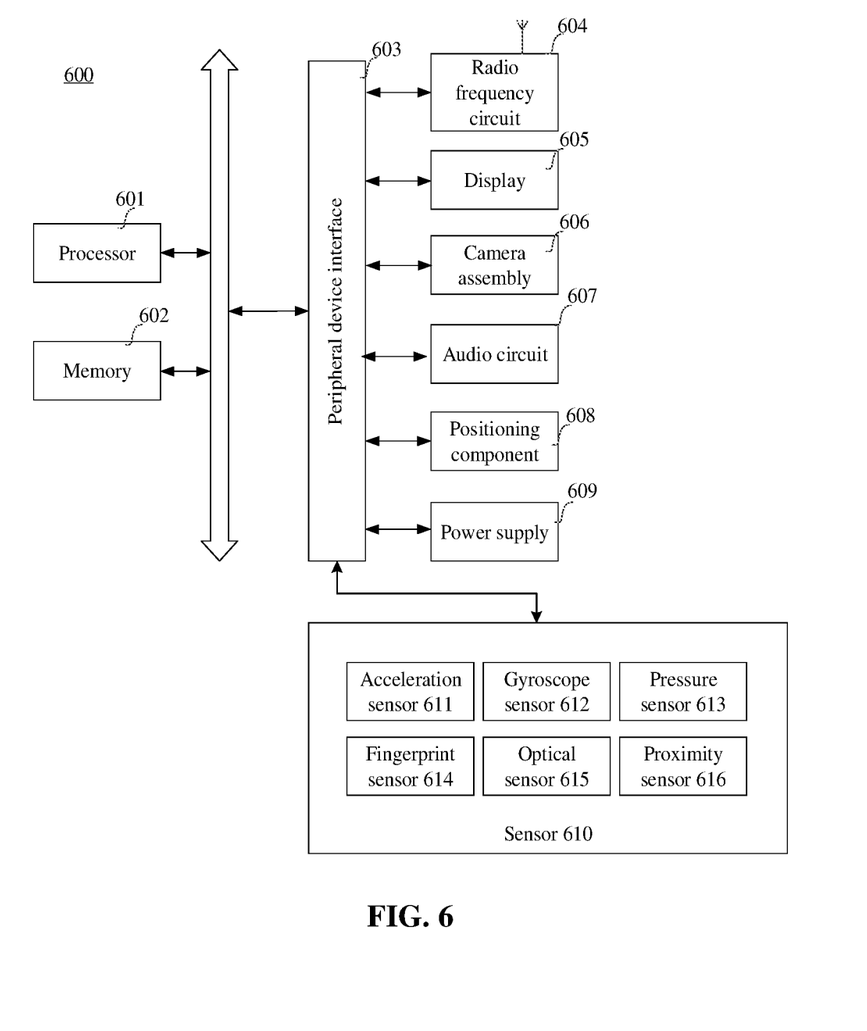
FIG. 6 is a structural block diagram of a terminal 600 according to an embodiment of the present disclosure.

FIG. 6 is a structural block diagram of a terminal 600 according to an embodiment of the present disclosure. The terminal 600 may be a smartphone, a tablet computer, a Moving Picture Experts Group Audio Layer III (MP3) player, a Moving Picture Experts Group Audio Layer IV (MP4) player, a laptop computer, or a desktop computer. The terminal 600 may also be referred to as user equipment, a portable terminal, a laptop terminal, a desktop terminal, or the like.

Generally, the terminal 600 includes a processor 601 and a memory 602.

The processor 601 may include one or more processing cores, for example, a 4-core processor or an 8-core processor. The processor 601 may be implemented by using at least one hardware form of digital signal processing (DSP), a field-programmable gate array (FPGA), and a programmable logic array (PLA). The processor 601 may alternatively include a main processor and a coprocessor. The main processor is configured to process data in an awake state, also referred to as a central processing unit (CPU), and the coprocessor is a low-power processor configured to process data in a standby state. In some embodiments, the processor 601 may be integrated with a graphics processing unit (GPU). The GPU is configured to be responsible for rendering and drawing content that a display needs to display. In some embodiments, the processor 601 may further include an artificial intelligence (AI) processor. The AI processor is configured to process computing operations related to machine learning.

The memory 602 may include one or more computer readable storage media, which may be non-transient. The memory 602 may further include a high-speed random access memory and a non-volatile memory such as one or more magnetic disk storage devices and a flash storage device. In some embodiments, the non-transitory computer readable storage medium in the memory 602 is configured to store at least one instruction. The at least one instruction is executed by the processor 601 to implement the method for transmitting a multimedia resource provided in the embodiments of the present disclosure.

In some embodiments, the terminal 600 may further optionally include a peripheral device interface 603 and at least one peripheral device. The processor 601, the memory 602, and the peripheral device interface 603 may be connected through a bus or a signal cable. Each peripheral device may be connected to the peripheral device interface 603 through a bus, a signal cable, or a circuit board. In some embodiments, the peripheral device includes at least one of the following: a radio frequency circuit 604, a display 605, a camera assembly 606, an audio circuit 607, a positioning component 608, and a power supply 609.

The peripheral device interface 603 may be configured to connect at least one peripheral device related to input/output (I/O) to the processor 601 and the memory 602. In some embodiments, the processor 601, the memory 602, and the peripheral device interface 603 are integrated into the same chip or circuit board; in some other embodiments, any one or two of the processor 601, the memory 602, and the peripheral device interface 603 may be implemented on an independent chip or circuit board. This is not limited in the embodiments of the present disclosure.

The radio frequency circuit 604 is configured to receive and transmit a radio frequency (RF) signal, also referred to as an electromagnetic signal. The radio frequency circuit 604 communicates with a communications network and another communications device by using the electromagnetic signal. The radio frequency circuit 604 may convert an electric signal into an electromagnetic signal for transmission, or convert a received electromagnetic signal into an electric signal. In some embodiments, the radio frequency circuit 604 includes: an antenna system, an RF transceiver, one or more amplifiers, a tuner, an oscillator, a digital signal processor, a codec chip set, a subscriber identity module card, and the like. The radio frequency circuit 604 may communicate with another terminal through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 604 may further include a near field communication (NFC) related circuit, and is not limited in the present disclosure.

The display 605 is configured to display a user interface (UI). The UI may include a graph, a text, an icon, a video, and any combination thereof. When the display 605 is a touch display, the display 605 is further capable of acquiring a touch signal on or above a surface of the display 605. The touch signal may be inputted to the processor 601 for processing as a control signal. In this case, the display 605 may be further configured to provide a virtual button and/or a virtual keyboard, which is also referred to as a soft button and/or a soft keyboard. In some embodiments, there may be one touch display 605, disposed on a front panel of the terminal 600. In some other embodiments, there may be at least two displays 605, disposed on different surfaces of the terminal 600 respectively or in a folded design. In still other embodiments, the touch display 605 may be a flexible display, disposed on a curved surface or a folded surface of the terminal 600. Even, the display 605 may be further set in a non-rectangular irregular pattern, namely, a special-shaped screen. The display 605 may be prepared by using materials such as a liquid crystal display (LCD), an organic light-emitting diode (OLED), or the like.

The camera assembly 606 is configured to acquire an image or a video. In some embodiments, the camera assembly 606 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth-of-field camera, a wide-angle camera, and a telephoto camera, to implement a background blurring function by fusing the main camera and the depth-of-field camera, and panoramic shooting and virtual reality (VR) shooting functions or other fusing shooting functions by fusing the main camera and the wide-angle camera. In some embodiments, the camera assembly 606 may further include a flash. The flash may be a single color temperature flash, or may be a double color temperature flash. The double color temperature flash is a combination of a warm light flash and a cold light flash, and may be used for light compensation under different color temperatures.

The audio circuit 607 may include a microphone and a speaker. The microphone is configured to collect sound waves of a user and an environment, and convert the sound waves into electric signals and input the electrical signals into the processor 601 for processing, or input the electrical signals into the radio frequency circuit 604 to implement voice communication. For the purpose of stereo sound collection or noise reduction, there may be a plurality of microphones, respectively disposed at different parts of the terminal 600. The microphone may be further an array microphone or an omnidirectional collection microphone. The speaker is configured to convert electric signals from the processor 601 or the radio frequency circuit 604 into sound waves. The speaker may be a conventional thin-film speaker or a piezoelectric ceramic speaker. In a case that the speaker is the piezoelectric ceramic speaker, electric signals not only can be converted into sound waves audible to human, but also can be converted into sound waves inaudible to human for ranging and other purposes. In some embodiments, the audio circuit 607 may further include an earphone jack.

The positioning component 608 is configured to position a current geographic location of the terminal 600, to implement a navigation or a location based service (LBS). The positioning component 608 may be a positioning component based on the Global Positioning System (GPS) of the United States, the BeiDou system of China, or the Grenas system of Russia, or the GALILEO system of the EU.

The power supply 609 is configured to supply power for various components in the terminal 600. The power supply 609 may be an alternating current, a direct current, a disposable battery, or a rechargeable battery. When the power supply 609 includes the rechargeable battery, the rechargeable battery may be a wired rechargeable battery or a wireless rechargeable battery. The rechargeable battery may be further configured to support a fast charge technology.

In some embodiments, the terminal 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect acceleration on three coordinate axes of a coordinate system established by the terminal 600. For example, the acceleration sensor 611 may be configured to detect components of gravity acceleration on the three coordinate axes. The processor 601 may control, according to a gravity acceleration signal collected by the acceleration sensor 611, the touch display 605 to display the user interface in a landscape view or a portrait view. The acceleration sensor 611 may be further configured to collect game or user motion data.

The gyroscope sensor 612 may detect a body direction and a rotation angle of the terminal 600. The gyroscope sensor 612 may cooperate with the acceleration sensor 611 to collect a 3D action performed by the user on the terminal 600. The processor 601 may implement the following functions according to the data collected by the gyroscope sensor 612: motion sensing (such as changing the UI according to a tilt operation of the user), image stabilization at shooting, game control, and inertial navigation.

The pressure sensor 613 may be disposed on a side frame of the terminal 600 and/or a lower layer of the display 605. When the pressure sensor 613 is disposed on the side frame of the terminal 600, a holding signal of the user on the terminal 600 may be detected. The processor 601 performs left and right hand recognition or a quick operation according to the holding signal collected by the pressure sensor 613. When the pressure sensor 613 is disposed on the lower layer of the touch display 605, the processor 601 controls an operable control on the UI according to a pressure operation of the user on the touch display 605. The operable control includes at least one of a button control, a scroll bar control, an icon control and a menu control.

The fingerprint sensor 614 is configured to collect a fingerprint of a user, and the processor 601 identifies an identity of the user according to the fingerprint collected by the fingerprint sensor 614, or the fingerprint sensor 614 identifies an identity of the user according to the collected fingerprint. When the identity of the user is identified as a trusted identity, the processor 601 authorizes the user to perform a related sensitive operation. The sensitive operation includes unlocking a screen, viewing encrypted information, downloading software, payment, changing settings, and the like. The fingerprint sensor 614 may be disposed on a front surface, a back surface, or a side surface of the terminal 600. When the terminal 600 is provided with a physical button or a vendor logo, the fingerprint sensor 614 may be integrated with the physical button or the vendor logo.

The optical sensor 615 is configured to collect ambient light intensity. In an embodiment, the processor 601 may control display brightness of the touch display 605 according to the ambient light intensity collected by the optical sensor 615. In some embodiments, when the ambient light intensity is relatively high, the display brightness of the display 605 is turned up. When the ambient light intensity is relatively low, the display brightness of the display 605 is turned down. In another embodiment, the processor 601 may further dynamically adjust a camera parameter of the camera assembly 606 according to the ambient light intensity collected by the optical sensor 615.

The proximity sensor 616, also referred to as a distance sensor, is usually disposed on the front panel of the terminal 600. The proximity sensor 616 is configured to collect a distance between a user and the front surface of the terminal 600. In an embodiment, when the proximity sensor 616 detects that the distance between the user and the front surface of the terminal 600 gradually becomes smaller, the display 605 is controlled by the processor 601 to switch from a screen-on state to a screen-off state. In a case that the proximity sensor 616 detects that the distance between the user and the front surface of the terminal 600 gradually becomes larger, the display 605 is controlled by the processor 601 to switch from the screen-off state to the screen-on state.

In some embodiments, the terminal includes at least one processor and at least one memory configured to store an instruction executable by the at least one processor, where the at least one processor is configured to execute the instruction to perform the above method.

In some embodiments, a non-temporary computer-readable storage medium including at least one instruction is further provided, for example, a memory including at least one instruction. The at least one instruction may be executed by a processor in a terminal to perform the method for transmitting a multimedia resource in the foregoing embodiment. In some embodiments, the foregoing storage medium may be a non-transitory computer-readable storage medium. For example, the non-transitory computer-readable storage medium may include a read-only memory (ROM), a random access memory (RAM), a compact disc read-only memory (CD-ROM), a magnetic tape, a floppy disk, an optical data storage device, or the like.

In some embodiments, when at least one instruction in the non-temporary computer-readable storage medium is executed by at least one processor of a terminal, the terminal is caused to perform the above method.

All embodiments of the present disclosure may be performed alone or in combination with other embodiments, all of which are considered to be within the scope of protection claimed by the present disclosure.

What is claimed is:

1. A method for transmitting a multimedia resource, applied to a terminal, the method comprising:
   determining target address information based on a media presentation description of a multimedia resource, wherein the media presentation description comprises address information of the multimedia resource having different code rates, and the target address information is address information of the multimedia resource having a target code rate; and
   sending a frame acquiring request carrying the target address information to a server, wherein the frame acquiring request comprises information indicating a target timestamp, and is configured to instruct the server to transmit media frames of the multimedia resource starting from the target timestamp at the target code rate and at a frame level.

2. The method according to claim 1, wherein said determining the target address information based on the media presentation description of the multimedia resource comprises:
determining the target code rate; and
acquiring the target address information from the address information in the media presentation description based on the target code rate.

3. The method according to claim 2, wherein said determining the target code rate comprises:
in response to a code rate selection instruction, determining a value carried by the code rate selection instruction as the target code rate; or
determining the target code rate by adjusting the target code rate to be a code rate corresponding to current network bandwidth information.

4. The method according to claim 3, wherein said adjusting the target code rate to be the code rate corresponding to current network bandwidth information comprises:
adjusting the target code rate to be the code rate corresponding to current network bandwidth information through an adaptation function.

5. The method according to claim 1, further comprising:
determining a to-be-switched code rate in response to a code rate switching instruction;
acquiring to-be-switched address information from the address information in the media presentation description, wherein the to-be-switched address information is address information of the multimedia resource having the to-be-switched code rate; and
sending a frame acquiring request carrying the to-be-switched address information to the server.

6. The method according to claim 1, wherein the frame acquiring request further carries at least one of a first extended parameter or a second extended parameter, the first extended parameter indicates whether the media frames are audio frames, and the second extended parameter indicates the target timestamp from which transmission of the media frames of the multimedia resource starts.

7. The method according to claim 6, wherein the target timestamp is later than a current moment in a case that the second extended parameter is greater than zero;
the target timestamp is a timestamp of a keyframe or an audio frame closest to the current moment in a case that the second extended parameter is equal to zero; and
the target timestamp is earlier than the current moment and the media frames comprise media frames that have been cached since the target timestamp, in a case that the second extended parameter is less than zero.

8. The method according to claim 1, wherein the media presentation description comprises a version number and a media description set, wherein,
the version number comprises at least one of a version number of the media presentation description or a version number of a resource transmission standard; and
the media description set comprises multiple pieces of media description meta-information, each piece of media description meta-information corresponds to the multimedia resource at a code rate, and each piece of media description meta-information comprises a length of a group of pictures and attribute information of the multimedia resource corresponding to the media description meta-information.

9. The method according to claim 8, wherein each piece of attribute information comprises identification information of the multimedia resource, an encoding mode of the multimedia resource, a code rate supported by the multimedia resource, and address information of the multimedia resource at the code rate.

10. A terminal, comprising:
at least one processor; and
at least one memory configured to store an instruction executable by the at least one processor;
wherein the at least one processor executes the instruction to perform the following operations:
determining target address information based on a media presentation description of a multimedia resource, wherein the media presentation description comprises address information of the multimedia resource having different code rates, and the target address information is address information of the multimedia resource having a target code rate; and
sending a frame acquiring request carrying the target address information to a server, wherein the frame acquiring request comprises information indicating a target timestamp, and is configured to instruct the server to transmit media frames of the multimedia resource starting from the target timestamp at the target code rate and at a frame level.

11. The terminal according to claim 10, wherein the at least one processor executes the instruction to perform the following operations:
determining the target code rate; and
acquiring the target address information from the address information in the media presentation description based on the target code rate.

12. The terminal according to claim 11, wherein the at least one processor executes the instruction to perform the following operation:
in response to a code rate selection instruction, determining a value carried by the code rate selection instruction as the target code rate.

13. The terminal according to claim 11, wherein the at least one processor executes the instruction to perform the following operation:
determining the target code rate to be a code rate corresponding to current network bandwidth information.

14. The terminal according to claim 11, wherein
the at least one processor executes the instruction to perform the following operation:
adjusting the target code rate to be a code rate corresponding to current network bandwidth information through an adaptation function.

15. The terminal according to claim 10, wherein the at least one processor further executes the instruction to perform the following operations:
determining a to-be-switched code rate in response to a code rate switching instruction;
acquiring to-be-switched address information from the address information in the media presentation description, wherein the to-be-switched address information is address information of the multimedia resource having the to-be-switched code rate; and
sending a frame acquiring request carrying the to-be-switched address information to the server.

16. The terminal according to claim 10, wherein the frame acquiring request further carries at least one of a first extended parameter or a second extended parameter, the first extended parameter indicates whether the media frames are audio frames, and the second extended parameter indicates the target timestamp from which transmission of the media frames of the multimedia resource starts.

17. The terminal according to claim 16, wherein the target timestamp is later than a current moment in a case that the second extended parameter is greater than zero;

the target timestamp is a timestamp of a keyframe or an audio frame closest to the current moment in a case that the second extended parameter is equal to zero; and the target timestamp is earlier than the current moment and the media frames comprise media frames that have been cached since the target timestamp, in a case that the second extended parameter is less than zero.

18. The terminal according to claim 10, wherein the media presentation description comprises a version number and a media description set, wherein, the version number comprises at least one of a version number of the media presentation description or a version number of a resource transmission standard; and the media description set comprises multiple pieces of media description meta-information, each piece of media description meta-information corresponds to the multimedia resource at a code rate, and each piece of media description meta-information comprises a length of a group of pictures and attribute information of the multimedia resource corresponding to the media description meta-information.

19. The terminal according to claim 18, wherein each piece of attribute information comprises identification information of the multimedia resource, an encoding mode of the multimedia resource, a code rate supported by the multimedia resource, and address information of the multimedia resource at the code rate.

20. A non-temporary computer-readable storage medium, wherein at least one instruction in the storage medium, when executed by at least one processor of a terminal, causes the terminal to perform the following operations:

determining target address information based on a media presentation description of a multimedia resource, wherein the media presentation description comprises address information of the multimedia resource having different code rates, and the target address information is address information of the multimedia resource having a target code rate; and sending a frame acquiring request carrying the target address information to a server, wherein the frame acquiring request comprises information indicating a target timestamp, and is configured to instruct the server to transmit media frames of the multimedia resource starting from the target timestamp at the target code rate and at a frame level.

\* \* \* \* \*